United States Patent

Ozalp

[19]

[11] Patent Number: 5,991,541
[45] Date of Patent: Nov. 23, 1999

[54] DYNAMICALLY MODIFIABLE CALL PROCESSING METHODS AND APPARATUS

[75] Inventor: Ahmet Ozalp, Stratford, Conn.

[73] Assignee: ADC Telecommunications, Inc., Minnetonka, Minn.

[21] Appl. No.: 08/695,637

[22] Filed: Aug. 12, 1996

[51] Int. Cl.$^6$ .............................. G06F 9/44; H04M 3/42
[52] U.S. Cl. .................... 395/710; 395/712; 395/685; 395/680; 395/500; 379/207; 379/201; 379/229
[58] Field of Search ..................... 395/500, 680, 395/685, 200.1, 200.54, 701–712, 683, 200; 379/133, 227, 242, 357, 207, 201, 219, 220, 269; 371/27.1

[56] References Cited

U.S. PATENT DOCUMENTS

| | | | |
|---|---|---|---|
| 4,713,806 | 12/1987 | Oberlander et al. | 370/58 |
| 5,586,177 | 12/1996 | Farris et al. | 379/230 |
| 5,655,014 | 8/1997 | Walsh et al. | 379/201 |
| 5,673,261 | 9/1997 | Tjabben et al. | 370/384 |
| 5,724,406 | 3/1998 | Juster | 379/67 |

OTHER PUBLICATIONS

Tanir et al, "The Design of a Library Support System for a Telecommunication System Synthesis Environment", IEEE Proceedings of the Fourth International Workshop on Rapid System Prototyping, pp. 120–131, Jun. 1993.

Cohen et al, "Generic Simulation Models of Communication Systems", IEEE Proceedings of the 29th Annual Simulation Symposium, pp.81–88, Apr. 1996.

Tanir et al, "On the Design of Real–Time Telecommunication Systems", Proceedings of the IEEE Workshop on Real–Time Applications, pp. 59–63, May 1993.

Hirschman, "Voice Services Concepts For Intelligent Networks", Globecom '90: IEEE Global Telecommunications Conference and Exhibition, pp. 1645–1649, Dec. 1990.

*Primary Examiner*—Tariq R. Hafiz
*Assistant Examiner*—Tuan Q. Dam
*Attorney, Agent, or Firm*—Schwegman, Lundberg, Woessner & Kluth, P.A.

[57] ABSTRACT

Dynamically modifiable call processing logic includes creating a Basic Call State Machine (BCSM) which is an instantiation of a dynamically executable Call Model having one or more initialization files and one or more shared library functions. The Call Model supplies the BCSM with Advanced Intelligent Network (AIN) compliant basic call processing logic as well as other features and configuration instructions. The BCSM is provided with a number of states, each of which corresponds to a point-in-call (PIC). Each PIC includes one or more substates and may include one or more trigger detection point (TDP). Each TDP includes at least one trigger. The Call Model, which is used to build the BCSM, includes the number of PICs and TDPs in the BCSM, the number of substates in each PIC, the number of triggers in each TDP, state transition information about which events lead to which PIC, the Call Model specific function calls associated with each substate and trigger, information about which PICs belong to which stage of a call, and the pre-processor and configuration functions. The initialization files include AIN defined events as well as other events defined by the developer, definitions of each PIC, and definitions of each trigger including what function is to be bound to each TDP. The Call Model is written with "C" language functions and the functions specify which shared libraries contain the definitions of the functions.

7 Claims, 4 Drawing Sheets

Microfiche Appendix Included
(2 Microfiche, 129 Pages)

DYNAMICALLY MODIFIABLE CALL PROCESSING METHODS AND APPARATUS

This application is related to co-pending co-owned Ser. No. 08/662,077 filed Jun. 12, 1996, entitled "Methods and Apparatus for Controlling Digital Communications Switching Equipment", the complete disclosure of which is incorporated herein by reference.

BACKGROUND OF THE INVENTION

1. Field of the Invention

The invention relates to telecommunications switching systems. More particularly, the invention relates to telecommunications call processing logic which is dynamically modifiable without interruption of service.

2. State of the Art

Modern telecommunications switching systems use hardware and software to process calls and provide various telecommunications services. Call processing generally involves at least two segments, the originating call segment and the terminating call segment. These segments refer to the calling party and the called party. In multi-party calls, there may be several segments involved in call processing.

The originating call segment is processed, for example, by setting up the call, granting authorization for the call, collecting and analyzing information, and selecting a route for the call. In the case of wireless cellular telecommunications, the originating call segment may also be processed by selecting a frequency, measuring signal strength, initiating a handoff, etc.

The terminating call segment is processed, for example, by presenting the call, finding resources, accepting the call, and answering the call. In the case of wireless cellular telecommunications, the terminating call segment may also be processed by selecting a frequency, measuring signal strength, initiating a handoff, etc.

In both the originating and terminating call segments, calls are further processed by detecting busy networks and busy terminals, by detecting disconnects and failed authorizations, and by detecting no answers, for example.

State of the art software used in call processing is "hard coded" in the host processor of a digital telecommunications switch. When a call segment is initiated, a particular software routine is called and is run from start to end. As with all software systems, and in particular with telecommunications software systems, frequent system updates need to be made. These updates are used to effect new features, to change the configuration of a switch, to improve efficiency, or to eliminate bugs, for example. One of the difficulties in updating telecommunications software is that the software must continue to run so long as the switch is in operation. Therefore, in order to modify the software, the switch must be taken out of service while the system update is performed. This is problematic for two reasons. Service is diminished during the update process and calls will often be interrupted when the switch is taken out of service. Moreover, if the system update needs to be de-bugged, the switch must be taken out of service again resulting in further diminished service capacity and additional call interruptions.

One partial solution to the problems of software system updates is to use redundant switch hardware and software. In these systems, a backup switch system is updated with new software without interrupting the main switch hardware and software. After the backup system is updated, service is transferred from the main switch system to the backup system and the main switch is updated. This solution avoids much of the problem relating to diminished service capacity, but it does not solve the problem of interrupted calls. During the transfer from the main switch to the backup switch, there is a short period of service interruption. During the transfer, transient calls (calls which are in the process of being connected) on the main switch will be dropped. This partial solution is relatively expensive in that almost every hardware component of the switch must be duplicated. In addition, the software used to effect a transfer of service from the main switch to the backup and vice versa is complex.

Figure 1:
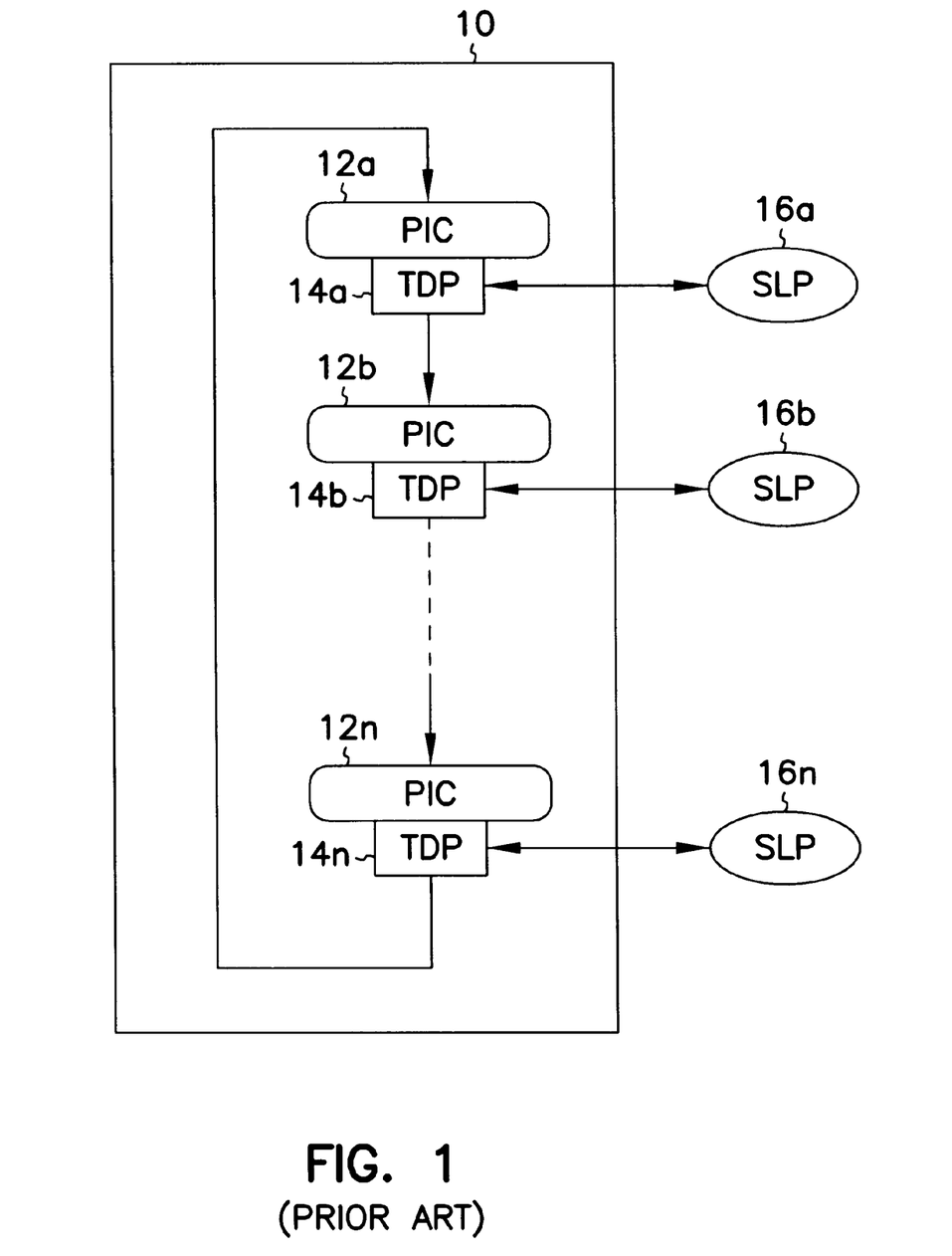
FIG. 1 is a schematic illustration a prior art call processing module according to an AIN specification.

Another, more sophisticated approach to solving the problems associated with system updates is described in the Bellcore Advanced Intelligent Networks (AIN) specification. The AIN specification modularizes system software so that new features can be added without interruption of service. Prior art FIG. 1 shows a schematic diagram of the AIN specification. The system software includes a main call processing module 10 which is structured as a finite state machine having well defined points-in-call (PICs) 12$a$, 12$b$, ..., 12$n$, each of which is associated with one or more trigger detection points (TDPs) 14$a$, 14$b$, ..., 14$n$ where the state machine sends a query to an external service logic program (SLP) 16$a$, 16$b$, ..., 16$n$ to receive instructions for the further processing of the call. SLPs may reside locally or remotely and may be modified without interrupting the main call processing module 10. For example, the first PIC 12$a$ in an originating call module may get the number dialed and the first TDP 14$a$ will parse the number to determine if it contains a special feature such as being an "800" number or a "900" number. If the number is an "800" number, for example, an SLP 16$a$ for "800" number service is invoked. The next PIC 12$b$ may be used to route the call to an appropriate trunk, etc.

A significant drawback of the AIN specification is that the main call processing module 10 must be painstakingly designed in order to anticipate the addition of every possible SLP and provide appropriate TDPs. Thus far, the AIN specification has been only partially implemented. For example, AIN specification version 0.1 has been implemented and version 0.2 has been partially implemented. These implemented specifications provide relatively limited functionality. An all-encompassing AIN specification version 1.0 is being designed, but it will require years of development and testing before the entire specification can be realized. In its present state, AIN version 1.0 requires additional capabilities from an underlying communications protocol (the TCAP layer of the SS7 protocol stack) which is not supported by any of today's standards. For example, the message lengths required by AIN 1.0 exceed the maximum message length permitted by the ANSI TCAP protocol in use today. Moreover, the AIN specification is not designed to facilitate incremental development of new features, but rather to accommodate a large number of predefined features (SLPs). In addition, the AIN specification does not provide any way to directly modify the main call processing module 10 without interrupting service. Nevertheless, AIN specifications 0.1 and 0.2 have received widespread support and most switch systems sold today support the AIN specifications 0.1 and 0.2 (as well as other specifications).

SUMMARY OF THE INVENTION

It is therefore an object of the invention to provide dynamically modifiable call processing software for use with digital telecommunications switches.

It is also an object of the invention to provide call processing software which is dynamically modifiable without interrupting service.

It is another object of the invention to provide dynamically modifiable call processing software which is AIN compliant.

It is still another object of the invention to provide dynamically modifiable call processing software which can be modified during run-time to update the basic call processing logic as well as to add new features.

In accord with these objects which will be discussed in detail below, the methods and apparatus of the present invention result in part from the realization that the use of dynamic linking and shared libraries in the construction of call processing software can produce unexpected and highly desirable results. While it is generally known in the software arts that memory resources can be conserved through the use of dynamic linking and shared libraries, it has been realized by the inventors herein that these programming techniques can be adapted to provide call processing telecommunications software which is dynamically modifiable without requiring any interruption of service. Dynamic linking and shared library programming techniques are disclosed generally in "Sun OS™ 5.1 Linker and Libraries Manual" (December 1992), Sun Microsystems, Inc., Mountain View, Calif., the complete disclosure of which is hereby incorporated by reference herein. Generally speaking, linking involves the use of a link editor which, when invoked, concatenates object files to create relocatable files, executable files and shared libraries which are used by a run-time linker to create a "runnable process". Object files may include relocatable objects, shared objects, static executables, and dynamic executables. In the case of dynamic executables, the link editor reads the shared objects and performs symbol lookup and verification, but only records the name of the dependencies (shared objects) and some bookkeeping information in the executable. At run-time, the contents of the shared objects are loaded into memory pages and are mapped into the virtual address space of the process calling for them. Program references are thus connected with their definitions when the program is executed.

Dynamically linked programs save disk space and process memory by sharing library code at run-time. If a second (concurrent) process calls for use of the same shared object, the entire contents of the shared object are mapped into the virtual address space of the second process, but only a single copy of the shared process resides in memory pages. In addition, dynamically linked code can be fixed or enhanced without having to re-link applications that depend on it, so long as the new code is compatible with the existing code. Although the memory pages containing the shared objects cannot generally be modified during run-time without losing the benefits of code sharing, the disk copy of the shared objects can be modified at any time. In addition, shared objects may be "versioned" using naming conventions so that updates can be added to a shared library without deleting the original files. If there is a problem or incompatibility in the updated shared object, the previous version of the shared object will be used by the linker.

Based in part on the foregoing understanding of linking and shared libraries, the methods and apparatus of the invention include defining each call segment as having a controlling active leg and at least one passive leg wherein the active leg refers to the external connectivity of the segment and the passive leg refers to the connectivity with the other call segment. The active leg and passive leg concepts are derived from the AIN specification. The ability to provide more than one passive leg allows for the representation of multiple party (conference) calls. According to the invention, a Basic Call Processor creates a Basic Call State Machine (BCSM) for each passive leg. The different BCSMs representing the different legs of a call are collectively referred to as a Call Model. When each BCSM is executed, it is associated with a Call Model which acts like a dynamic executable having one or more initialization files (dependencies or shared objects). The Call Model supplies the BCSM with AIN compliant basic call processing logic as well as other features and configuration instructions. According to the invention, the BCSM is provided with a number of states, each of which corresponds to a PIC. Each PIC includes one or more substates and at least one TDP. Each TDP may include one or more triggers. The Call Model, which is used to build the BCSM, preferably includes the number of PICs and TDPs in the BCSM, the number of substates in each PIC, the number of triggers in each TDP, state transition information about which events lead to which PIC, the Call Model specific function calls associated with each substate and trigger, information about which PICs belong to which stage of a call, and the pre-processor and configuration function associated with the Call Model. The initialization files associated with each Call Model preferably include: event_pic_map.cm, events.cm, pic_data.cm, and trgr_data.cm. The event_pic_map.cm file specifies which PICs can be reached from each PIC. The events.cm file includes AIN defined events as well as other events defined by the Call Model developer. The pic_data.cm file contains definitions of each PIC. The trgr_data.cm file contains definitions of each trigger including what function is to be bound to each TDP. The Call Model is preferably written with "C" functions to define PICs, TDPs, and functions bound to TDPs and the functions specify which shared libraries contain the definitions of the functions.

Each instance of a BCSM is associated with a Call Model at the time the BCSM is created. Each Call Model is preferably related to a particular "access type". For example, the ANSI ISUP signalling protocol would be associated with one Call Model by defining a set of configuration files and function definitions as described above. Whenever the Basic Call Processor receives an initial address message (IAM) for an ISUP call, the Basic Call Processor will create an instance of a BCSM dynamically linked to a Call Model having an access type attribute set to ANSI ISUP. The BCSM will contain the appropriate set of PICs, TDPs, and C-functions to handle the ISUP message. The originating Call Model analyzes the called number and determines a route for the call. The route is selected from a hunt group which contains several circuits which lead to the same destination. When a circuit is selected, a terminating segment Call Model is chosen for the particular circuit type. Once the terminating segment BCSM is created, it can change its Call Model so long as the states and substates of both Call Models are compatible. Typically the terminating call segment BCSM will change Call Models if hunt groups are allowed to contain circuits controlled by different signalling types. The signalling type, therefore, cannot be determined until the circuit is identified. In this situation, the BCSM would be created with an appropriate Call Model and then switch to another Call Model once the actual circuit is identified.

Preferred aspects of the invention include designating each Call Model with a unique name and updating an existing Call Model through the use of versioning.

The invention allows complete dynamic run-time modification of Call Models and all functions associated therewith. New features can be added at any time without recompiling the Basic Call Processing software.

Additional objects and advantages of the invention will become apparent to those skilled in the art upon reference to the detailed description taken in conjunction with the provided figures and appendices.

BRIEF DESCRIPTION OF THE APPENDICES

Appendix A (99 pages) is a sample source code listing of a non-ISDN Call Model according to the invention, including makefile, NISDN_L_line.h, NISDN_L_trgr.h, NISDN_twc_trgr.c, NISDN_twc_proc.c, NISDN_orig_pics.c, NISDN_term_pics.c, NISDN_msg_proc.c, NISDN_oproc.c, NISDN_tproc.c, NISDN_config.c, and ibess_preproc.c;

Appendix B (6 pages) is a sample source code listing of Call Model initialization files according to the invention, including events.cm, event_pic_map.cm, pic_data.cm, and trgr_data.cm; and Appendix C (17 pages) is a sample source code listing of a service logic program for a three way call according to the invention, including makefile, function index, slp_twc.h, slp_twc.c, and slp_hash.c.

DETAILED DESCRIPTION OF THE PREFERRED EMBODIMENTS

Figure 2:
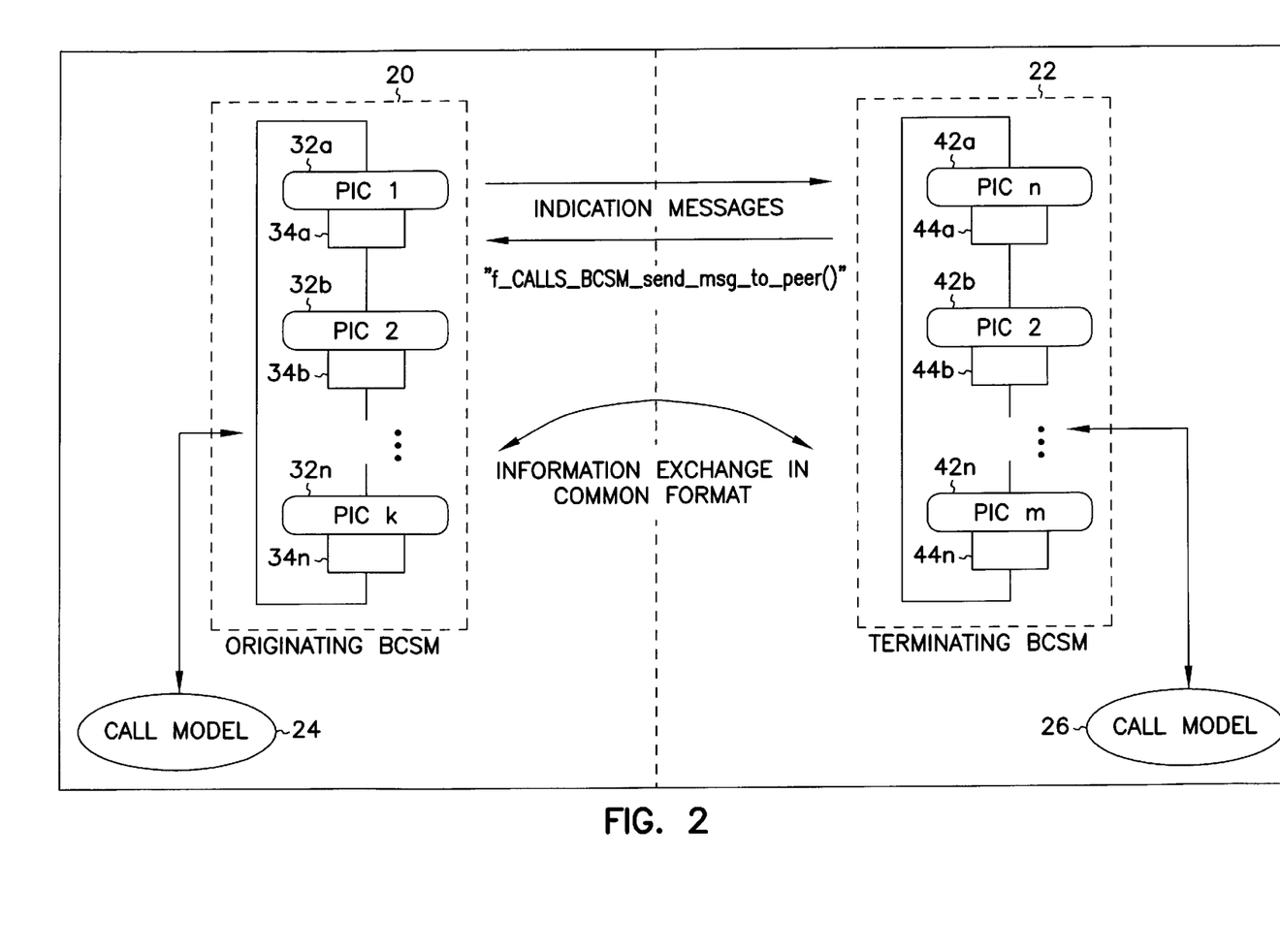
FIG. 2 is a schematic illustration of two BCSM and Call Model Objects in a two-party call according to the invention.

Referring now to FIG. 2, one of the methods of the invention is to create a basic call state machine (BCSM) 20, 22 for each segment of a call. As shown in FIG. 2, the BCSM 20 is created for the originating segment and the BCSM 22 is created for the terminating segment of a two party call. Each BCSM is executable code which is created at run-time by a Basic Call Processor and is dynamically linked to a Call Model 24, 26. A shown in FIG. 2, the Call Model 24 is used to create the originating BCSM 20 and the Call Model 26 is used to create the terminating BCSM 22. Each Call Model is comprised of dynamic executable code utilizing several shared libraries which are described in detail below. The Call Model, together with linked shared libraries defines the states of the BCSM which includes PICs and TDPs. As shown in FIG. 2, for example, the originating BCSM 20 includes PICs 32a, 32b, . . . , 32n and corresponding TDPs 34a, 34b, . . . , 34n. Similarly, the terminating BCSM 22 includes PICs 42a, 42b, . . . , 42n and corresponding TDPs 44a, 44b, . . , 44n. Once the BCSMs are created, they exchange information and messages as shown in FIG. 2 in order to complete processing of the call from the originating party to the terminating party. Communication between BCSMs is accomplished through the use of a common set of internal messages and associated data structures covering the essential call related information which is available for all Call Models.

As mentioned above, the BCSM is completely defined by the Call Model used to create it at run-time and the Call Model, in turn, relies on certain shared library objects in order to provide the desired functionality of call processing. A sample Call Model, which is written in "C" language is attached hereto as Appendix A.

Referring generally to Appendix A, the Call Model includes references to linked libraries, which are described below, for providing call processing functionality as well as linking to hardware specific libraries to support the host processor(s) of different digital telecommunications switches. For example, Makefile of Appendix A links to different libraries for different operating systems, i.e. SUN Solaris 2.x, Motorola 4.4 and up, and Intel (IBM) AIX 4.1.x. The Makefile also includes sources to different dynamically loaded parts of the Call Model (NISDN_L_line.h, NISDN_trgr.h, NISDN_twc_trgr.c, NISDN_twc_proc.c, NISDN_orig_pics.c, NISDN_term_pics.c, NISDN_msg_proc.c, NISDN_oproc.c, NISDN_tproc.c, NISDN_config.c, and ibess_preproc.c) and to shared object files which are designated by a pathname followed by the extension ".so".

As mentioned above, the sample Call Model of Appendix A is designed for processing non-ISDN calls. As such, it includes a header file NISDN_L_line.h which defines internal events used in the Call Model and which are related to processing non-ISDN calls. Internal events are defined at lines 76–125 of the NISDN_L_line.h file. In addition, AIN events which will be used by the Call Model are defined at lines 132–175, and user defined events are defined at lines 178–187 of the NISDN_L_line.h file. As mentioned above, each point in call (PIC) is represented by one or more entry and exit events and a map file, described below, assigns entry and exit events to specific PICS.

The NISDN_trgr.h header file of the Call Model defines specific internal triggers which will be available to the Call Model for processing a SLP. As shown in Appendix A, the sample Call Model includes triggers for processing a three way call (TWC). Multiple internal triggers within a trigger detection point effectively define substates.

The specific functions for handling a three way call are defined in the file NISDN_twc_trgr.c and include error handlers, originating midcall processing, and disconnect.

Communication between the SLP and the BCSM are handled by the code listed in the file NISDN_twc_proc.c which includes SLP message handling functions as well as procedures for effecting the TWC SLP such as putting the second party on hold prior to connecting the third party, processing the second call, merging the two calls, etc.

The originating call segment BCSM functions are defined in the file NISDN_orig_pics.c according to the points in call (PICs) and additional originating segment call processing functions are defined in the file NISDN_oproc.c according to the events associated with PICs. The terminating call segment BCSM functions are defined in the file NISDN_term_pics.c according to the points in call (PICs) and additional terminating segment call processing functions are defined in the file NISDN_tproc.c according to the events associated with PICS. The originating and terminating call segment PICs and events are described in more detail below with reference to Appendix B.

The sample Call Model of Appendix A also includes message processing (parsing) for inband signalling. The functions for message parsing are defined in the file NISDN_msg_proc.c and preprocessing functions are defined in the file ibess_preproc.c.

Additional configuration information is provided in the sample Call Model file NISDN_config.c which can be used to implement the Call Model without dynamic linking if necessary, for example in order to implement features of the system in a processor which does not support dynamic linking.

Generally, according to a preferred embodiment of the invention, there are four Call Model configuration files which are used by a Call Model and which support events setup in the BCSM. Sample configuration files are contained in Appendix B. These files may be generally referred to as an event list, a event-pic map, pic data, and trigger data. Turning first to the event list, an events.cm file according to the invention is shown by way of example in Appendix B. Each line of the file refers to a single event using the syntax shown in Table 1, below.

TABLE 1

| event index* | in use flag | event name | entry PIC |
|---|---|---|---|

The event index number is preferably a three digit number. The in use flag is a single bit or Y/N designation. The in use flag provides flexibility by permitting old or substitute records to be retained and easily available for use. The event name specifies a stage in the processing of a call and indicates whether it is part of an originating segment or a terminating segment. The entry PIC indicates whether the event is the result of a PIC. The events.cm file lists fifty-four events which may be used by the Call Model. The first event listed is a null event. Other events refer to various stages of call processing. Some events are designated as being an originating segment event by having "O_" in the event name. These originating segment events include events such as call origination attempt, attempt authorized, information collected, route selected, feature selected, network busy, etc. Other events are designated as being a terminating segment event by having a "T_" in the event name. These terminating segment events include events such as call presented, resource available, call accepted, busy, no answer, etc. Forty-four AIN version 0.2 events are listed as event numbers 001 through 044. These are the events supported by the Bellcore AIN specification. The remaining nine events are events provided by the Call Model developer for other call processing features contained in the Call Model.

Each event listed in Appendix B is also provided with an entry PIC number. Where more than one different PIC could link to the event (as is evident from the events_pic_map.cm configuration file described below), a null entry PIC number is provided. Where a non-zero entry PIC number is provided, there is only PIC which leads to this event.

As mentioned above, many of the events listed in the events.cm file and used by the Call Model to create the BCSM are linked to PICs. In order to provide the Call Model with the linking information needed, a configuration file called "event_pic_map" is provided. An event_pic_map.cm file according to the invention is shown by way of example in Appendix B. Each line of the file refers to an event in terms of a branching point from one PIC to another PIC or TDP using the syntax shown in Table 2, below.

TABLE 2

| current PIC | exit event(*) | goto | PIC/TDP |
|---|---|---|---|

The current PIC field indicates the PIC from which an event will cause a transition. The exit event indicates the event which will cause a transition from the current PIC. The goto field indicates the PIC (or TDP) to which the exit event will cause a transition. The PIC/TDP field indicates whether the item indicated in the goto field is a PIC or a TDP. Thus, if the PIC portion of the PIC/TDP state machine can be skipped, and the program can continue at the TDP, the PIC/TDP field will indicate "TDP". Typically, and as seen in the event_pic_map.cm file, the PIC will be indicated by the PIC/TDP field.

In the event_pic_map.cm file, it will be seen that twenty-five numbered PICs are listed together with events which cause the BCSM to exit one PIC and enter another. For example, event number 057 will cause the BCSM to exit PIC number 001 and enter PIC number 021. Most PICs may be exited in several ways to enter several possible PICs. For example, the BCSM can return to PIC number 001 from PIC number 008 if event number 053 occurs, or, it can skip forward to PIC number 018 if event number 034 occurs.

As mentioned above, each of the states of the BCSM is represented by a PIC which is dynamically linked to a shared library function. The events represent the results of the functions and direct the BCSM to the next appropriate PIC. The PIC functions are defined in a configuration file called pic_data.cm which is included in Appendix B. The structure of the file is illustrated in Table 3, below.

TABLE 3

| | | | | |
|---|---|---|---|---|
| configuration function name | | shared object library path | | |
| initialization function name | | shared object library path | | |
| criteria function name | | shared object library path | | |
| pre-processor function name | | shared object library path | | |
| first originating segment PIC | | PIC Index | | |
| first terminating segment PIC | | PIC Index | | |
| PIC index(*) | in use flag | PIC Name | call segment (Or./Tr.) | first trigger(*) | Call Stage |
| begin | | | | | |
| substate function name | | shared object library path | | |
| end | | | | | |

The first four rows of Table 3 indicate the name and location of configuration, initialization, criteria and preprocessor functions. As illustrated in the sample file pic_data.cm, these functions are named f_NISDN_configure, f_NISDN_initialize, ibss_pre_criterion, and ibss_pre_proc, respectively. All of the functions reside in the shared library directory NISDNtmplt/lib/libNISDNtmplt.so. The next two rows of Table 3 indicate the first originating call segment PIC and the first terminating call segment PIC. As illustrated in the sample file pic_data.cm, the first originating call segment PIC is number 01 and the first terminating call segment PIC is number 11.

Each PIC is identified in a single line having six fields: index number, in use flag, PIC name, call segment type, name of the first trigger attached to the PIC, and the call stage in which the PIC is involved. The functions dynamically linked to the PIC are identified between the delimiters "begin" and "end" following the PIC identification line. As illustrated in the sample file pic_data.cm, the first PIC is identified as number 01, having an in use flag Y, and the name AO_NULL (AO representing an AIN originating call segment PIC). PIC 01 is an originating call segment PIC, has no trigger attached to it, and is used in the "setup" call stage. There is only one function linked to the AO_NULL PIC and that is named f_nisdn_o_null, which is located in the shared library directory NISDNtmplt/lib/libNISDNtmplt.so.

From the foregoing, it will be appreciated that the sample file pic_data.cm identifies fourteen originating call segment PICs and eleven terminating call segment PICs. The originating segment PICs include setup PICs for attempting to originate a call (PIC 02), collecting info from the calling station (PIC 03), analyzing the info ((PIC 04), selecting the route (PIC 05), and authorizing call setup (PIC 06). Following the setup PICs, the originating call segment includes stable PICs for seizing a terminating segment (PIC 07) and for generating a ringing signal (PIC 08). In addition, the sample call model includes a mid-call PIC for linking to a service logic program (SLP). Originating segment PIC 09 includes a trigger to a three way call SLP. The trigger functions for PIC 009 are identified in the file trgr_data.cm of Appendix B and are found in the shared library NISDNtmplt/lib/NISDNtmplt.so. There are also five originating segment clear PICs which end the call or suspend the first portion of a three way call. PIC 10 suspends the first portion of a three way call and includes a trigger to the TWC SLP. PIC 18 ends the originating segment if there is an authorization failure, i.e. insufficient hardware resources to complete the call. PIC 19 ends the third party passive leg of the originating segment if the third party hangs up or if there is an error connecting to the third party. PICs 20 and 21 end the originating segment if there is a disconnect or an error.

The terminating call segment PICs include setup PICs for awaiting a terminating segment attempt (PIC 11), for requesting authorization for a terminating segment (PIC 12), for selecting terminating segment resources (PIC 13), and for authorizing the terminating segment (PIC 14). Following the setup PICs, the terminating call segment includes stable PICs for ringing the called party (PIC 15) and for suspending the terminating segment (PIC 16). There are five terminating segment clear PICs for ending the terminating segment. PIC 17 ends a suspended segment if a party hangs up or if there is an error. PICs 22 through 25 ends a terminating segment if a party hangs up or if there is an error.

Those skilled in the art will appreciate that by combining the information in events.com, event_pic_map.cm, and pic_data.cm, a complete flow chart of the Call Model can be realized. A partial flow chart illustrating the setup PICs of the originating call segment is shown in FIG. 3.

Figure 3:
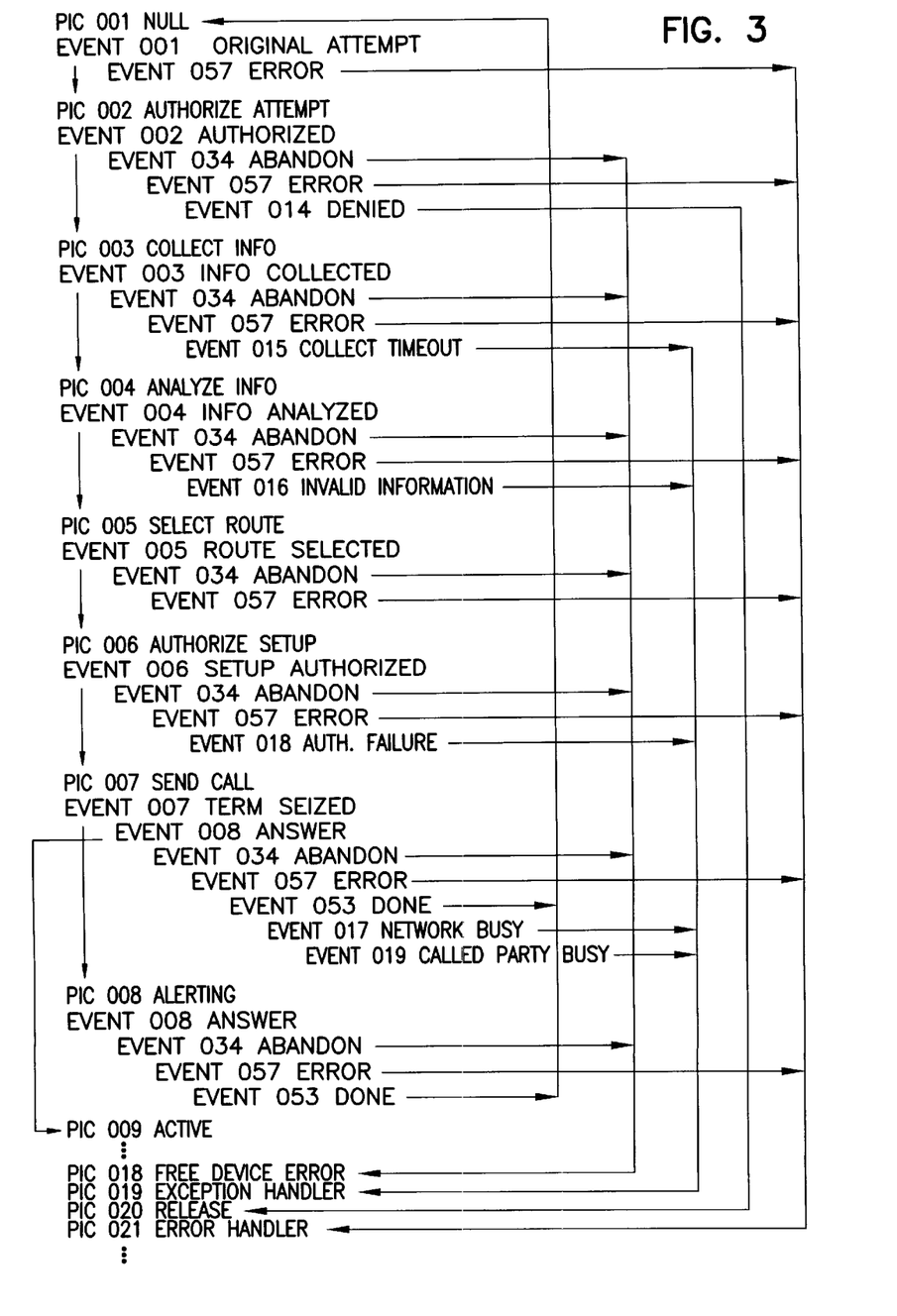
FIG. 3 is a partial flow chart of the setup PICs of an originating call segment.
Figure 4:
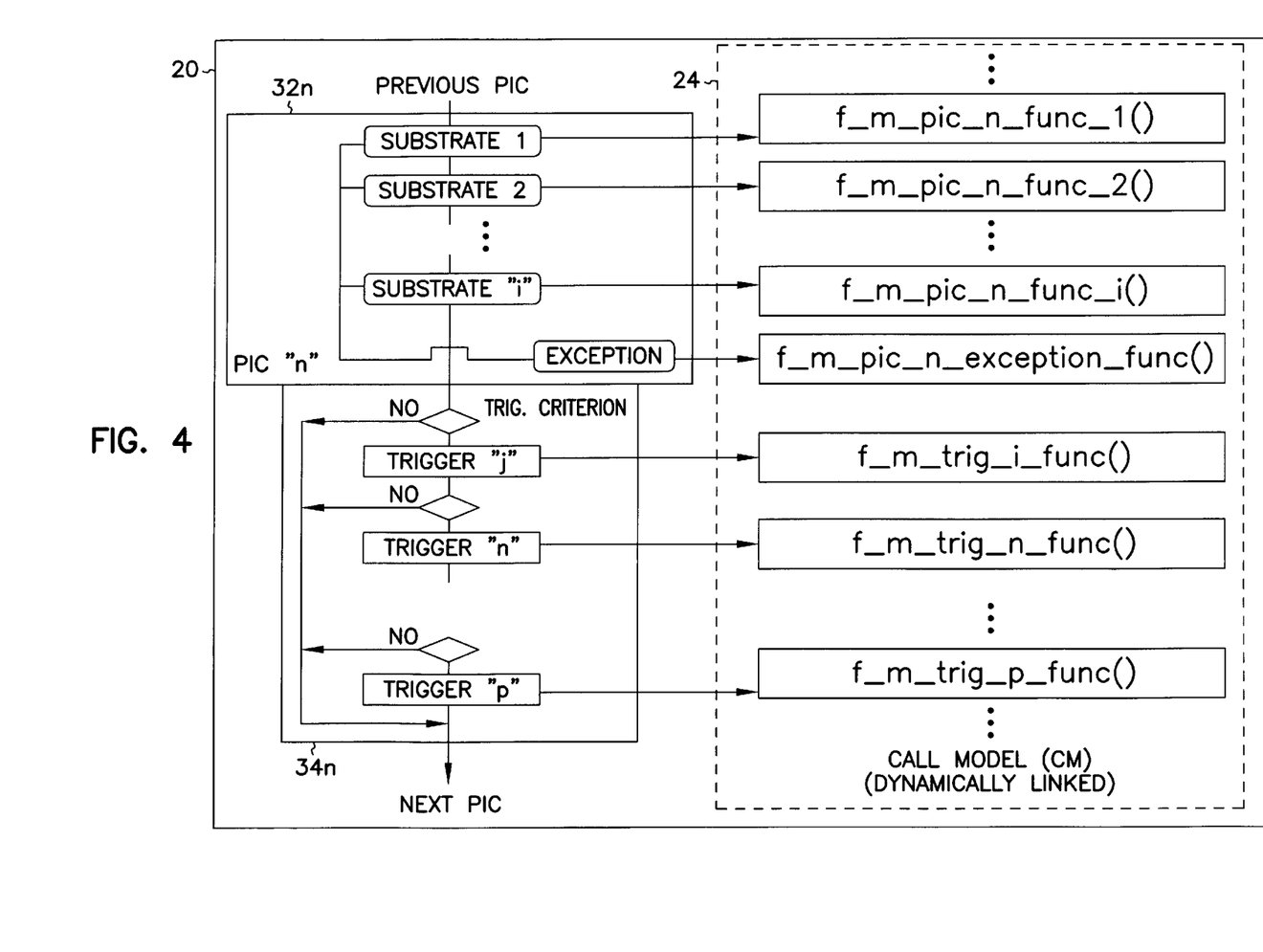
FIG. 4 is a schematic illustration of the dynamic linking between a BCSM and Call Model call processing functions according to the invention.

Turning now to FIG. 3, it will be appreciated that the originating call segment progresses from PIC 001 through to PIC 009 provided that the appropriate events occur at each point in the call (PIC). At each PIC, error and/or disconnect events will direct the flow of the BCSM to an error handling PIC or back to the null PIC 001.

As mentioned above, the BCSM is an instantiation of the Call Model which, in turn, is a dynamic executable calling upon shared library files. A schematic illustration of this relationship is shown in FIG. 3 wherein a portion of the BCSM 20 is shown in detail with respect to the Call Model 24. More specifically, each of the substates of PIC "n" 32*n* are mapped via the call model 24 to specific C functions "f_m_pic_n_func_#" which reside in shared library files. Similarly, each of the triggers in TDP 34*n* are mapped via the call model 24 to specific C functions "f_m_trig_n_func_#" which reside in shared library files.

Due to the dynamic structure of the BCSM according to the invention, any aspect of the BCSM can be modified without interrupting service. Individual functions can be modified to provide new features or to fix bugs. Moreover, the entire Call Model can be modified without disrupting any BCSM in use.

The methods described above may be readily implemented using existing hardware and C-language software. In operation, the call processing methods of the invention act as a virtual call processing machine and thus, the invention includes virtual apparatus as well as the methods described above.

The sample Call Model described above includes a trigger to an SLP for three way calling. According to another aspect of the invention, SLPs are created as dynamic executables and may also be modified without interrupting service. Appendix C shows the C source code for the three way calling SLP mentioned above. The code includes a makefile, a header file SLP_TWC.h, the program listing SLP_TWC.c and a hash file SLP_hash.c. The program listing SLP_TWC.c includes the main program at lines 126 through 343 wherein various functions are called, and function definitions at lines 359 through 1090. The hash file initializes and maintains a hash table for use by the three way call service logic program.

There have been described and illustrated herein dynamically modifiable call processing methods and apparatus. While particular embodiments of the invention have been described, it is not intended that the invention be limited thereto, as it is intended that the invention be as broad in scope as the art will allow and that the specification be read likewise. Thus, while particular naming conventions and syntaxes have been disclosed, it will be appreciated that other conventions and syntaxes could be utilized. Also, while specific numbers and types of shared files have been shown, it will be recognized that other types of shared files could be used with similar results obtained. Moreover, while particular configurations have been disclosed in reference to specific host processors, it will be appreciated that other configurations could be used as well. Furthermore, while the Call Model has been disclosed as having a specific number of dependent files and shared objects, it will be understood that a different of dependent files and shared objects can achieve the same or similar function as disclosed herein. It will therefore be appreciated by those skilled in the art that yet other modifications could be made to the provided invention without deviating from its spirit and scope as so claimed.

I claim:

1. A dynamically modifiable method for processing telephone calls in a public switched telephone network, comprising:

a) creating at least one shared library file containing modifiable call processing functions;

b) creating a dynamically executable call model containing at least one link to the at least one shared library file that includes call processing functions;

c) in response to a first set of calls occurring over a first period of time, creating a basic call state machine as an instantiation of the call model for each each one of said first set of calls, each state machine for processing one of said calls in said set;

d) at a point in time following the first period of time and while at least one of the first set of calls is being processed using one of the basic call state machines instantiated during the first period of time, modifying the at least one shared library file to change the call processing functions; and e) in response to at least one more call occurring after the shared library file is changed, creating a basic call state machine as an instantiation of the call model for the at least on more call, wherein the basic call state machine has at least one link to the at least one shared library file that includes the changed call processing functions, wherein the call model and the shared library file are modifiable without interrupting the processing of calls in progress being handled by instantiated basic call state machines, and without requiring a modification to the basic call state machine software.

2. A method according to claim 1, wherein:

the modifiable call processing functions include a plurality of points-in-call (PICs).

3. A method according to claim 2, wherein:

at least one of the PICs includes a trigger detection point (TDP).

4. A method according to claim 2, wherein:

at least some of the PICs are Advanced Intelligent Network (AIN) compliant.

5. A method according to claim 2, wherein:

the PICs are defined as computer language C-functions.

6. A method according to claim 3, wherein:

the TDP is defined as a computer language C-function.

7. A method according to claim 4, wherein:

the TDP is AIN compliant.

* * * * *

UNITED STATES PATENT AND TRADEMARK OFFICE
CERTIFICATE OF CORRECTION

PATENT NO.: 5,991,541

DATED: November 23, 1999

INVENTOR(S):Ahmet Ozalp

It is certified that error appears in the above-identified patent and that said Letters Patent is hereby corrected as shown below:

In column 1, line 9, insert --MICROFICHE APPENDIX
    A microfiche appendix having two microfiche and 129 frames is included in this specification.--.
In column 5, line 8, delete "appendices" and insert --microfiche appendix--, therefor.
In column 5, line 21, delete "APPENDICES" and insert --MICROFICHE APPENDIX--, therefor.
In column 5, line 24, delete "Appendix", and insert --Section--, therefor.
In column 5, line 31, delete "Appendix", and insert --Section--, therefor.
In column 5, line 35, delete "Appendix", and insert --Section--, therefor.

In column6, line 6, delete "Appendix A", and insert --Section A of the microfiche appendix--, therefor.
In column6, line 7, delete "Appendix A", and insert --Section A of the microfiche appendix--, therefor.
In column6, line 12, delete "Appendix A", and insert --Section A of the microfiche appendix--, therefor.
In column6, line 24-25, delete "Appendix A", and insert --Section A of the microfiche appendix--, therefor.

In column6, line 38, delete "Appendix A", and insert --Section A of the microfiche appendix--, therefor.
In column 6, line 62, delete "Appendix B", and insert --Section B of the microfiche appendix--, therefor.

Signed and Sealed this

First Day of May, 2001

Attest:

NICHOLAS P. GODICI

Attesting Officer     Acting Director of the United States Patent and Trademark Office